3,082,244
SULFONYL GLYCOL DIPROPIOLATES
Lee A. Miller, Dayton, Ohio, assignor to Monsanto
 Chemical Company, St. Louis, Mo., a corporation of
 Delaware
No Drawing. Filed Mar. 17, 1961, Ser. No. 96,356
4 Claims. (Cl. 260—486)

This invention relates to esters. More particularly, this invention provides dipropiolate esters of certain sulfonyl glycol compounds and methods for preparing the same.

An object of this invention is to provide new and valuable acetylenic acid esters. Another object of this invention is to provide dipropiolate esters of certain sulfonyl aliphatic glycols. Other objects and advantages will become apparent from reading the description and appended claims of this specification.

The above enumerated and other objects hereinafter defined are provided by the invention wherein there are prepared new and valuable esters of the formula

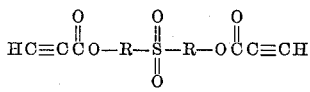

wherein R is an alkylene radical having 2 to 4 carbon atoms in the alkylene chain and from 2 to 6 carbon atoms in the alkylene radical.

The presently provided propiolate esters are prepared by reaction of propiolic acid, a propiolyl halide, or propiolic acid anhydride with a glycol, that is, a sulfonyl glycol of the formula

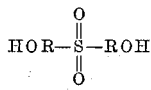

wherein R is as defined above. They can also be prepared by alcoholysis procedures by reacting a simple ester of propiolic acid with the appropriate sulfonyl compound. For example, by reacting methyl propiolate with 2,2′-sulfonyldiethanol, there is obtained 2,2′-sulfonyldiethanol dipropiolate with methanol as a by-product.

The presently useful sulfonyl glycol compounds used to prepare the diesters of this invention may also be described as bis(hydroxyalkyl) sulfones. Such compounds may be prepared by treating the corresponding hydroxy alkyl sulfide or sulfoxide in an aqueous medium containing a mild oxidizing agent optionally in the presence of a catalyst.

Examples of useful sulfonyldialkanol compounds which may be used to prepare compounds of the present invention are:

2,2′-sulfonyldiethanol,
2,2′-sulfonyldipropanol,
3,3′-sulfonyldipropanol,
3,3′-sulfonyldibutanol,
4,4′-sulfonyldibutanol, and
4,4′-sulfonyl-2,2′-diethyldibutanol.

The acetylenic acid compounds which are reacted with a sulfonyl glycol of the above-defined type are preferably propiolic acids or the propiolyl halides or the anhydride of said acids. Thus, propiolic acid, propiolyl chloride, bromide, iodide, or fluoride, or propiolic acid anhydride may be used as the acidic reactant. The propiolyl halide to be used as one of the reactants of the esterification reaction may be prepared by reacting propiolic acid with benzoyl halide. The reaction between benzoyl halide and propiolic acid is almost instantaneous at ambient temperature and being an equilibrium reaction it is desirable to remove one of the product materials during the course of the reaction in order to shift the equilibrium in the desired direction. In this respect, propiolyl halide is relatively more volatile than other materials in the reaction mass and for that reason the temperature of reaction is controlled to cause substantial vaporization of the propiolyl halide during the course of the reaction. The preparation of propiolyl chloride according to this procedure forms the subject of copending application of Lee A. Miller, Serial No. 6,344, filed February 3, 1960. The propiolyl chloride so formed may be led directly without intermediate recovery into a solution or suspension of the sulfonyl glycol which is to be esterified according to this invention.

Reaction of a sulfonyl glycol of the above-defined type with propiolic acid, propiolyl halide or propiolic acid anhydride takes place readily by simply contacting the acidic compound with the sulfonyl glycol reactant at ordinary or increased temperature and in the presence of an inert diluent or solvent. Advantageously, when propiolic acid is used, reaction is affected at a temperature of from say, 25–200° C. with temperatures on the order of from 50–120° C. being preferred. Heating within this temperature range is conducted until the desired degree of esterification has occurred, that is, until the dipropiolate of the sulfonyl glycol used has been formed. Using the propiolyl halide, optimum conditions include operation at temperatures which may be as low as say, −10° C., that is, extraneous heating may be unnecessary; instead cooling may be employed. It is advantageous to employ the reactants in stoichiometric proportions; however, a slight excess of either the acidic reactant or the sulfonyl glycol compound may be used. In the presence of an inert diluent or solvent and operating at a temperature which is below 120° C., the reaction proceeds to form the dipropiolate ester of the sulfonyl glycol compound. To obtain the product which is substantially only the dipropiolate ester, the reaction is discontinued when the quantity of evolved by-product is that calculated for dipropiolate esterification. In this case, any excess acidic reactant which is present is removed from the reaction mixture, for example, by distillation or extraction. Thus, whether or not the reactants are present in stoichiometric proportion, the use of an inert diluent or solvent and operation at a temperature below 200° C. for a time sufficient to remove the calculated amount of the evolved by-product are recommended for obtaining the presently provided well characterized esters in good yield. Use of temperatures, below 200° C. and operation in the presence of a diluent permit substantial limitation of the reaction to the diesterification, rather than to other reactions which could be expected to occur with the highly active triple bond acidic compounds and the bifunctional hydroxy compounds, for example, addition of the hydroxy radical across the triple bond of acidic component, polymerization of the acid compound, linear condensation of the sulfonyl glycol through etherification, etc.

Inert liquid diluents which are useful for the present purpose are liquid hydrocarbons generally, halogenated hydrocarbons, ethers or ketones, for example, benzene, toluene, xylene, hexane, petroleum spirits, dichlorobenzene, ethylene dichloride, carbon tetrachloride, tetrachlorohexane, dioxane, isopropyl ether, acetone, butanone, etc. A solvent or diluent, of course, serves to facilitate uniform distribution of the reactants throughout the reaction medium. When reacting a propiolyl halide with the sulfonyl glycol, it is preferred to employ a solvent or diluent which minimizes the tendency of the hydrogen halide by-product to react with the triple bond of the propiolic acid compound. In this connection, the solvent or diluent is selected on the basis of being the least compatible or having the poorest solvency for hydrogen halide. The preferred solvents or diluents for this purpose may be cycloalkanes, for example, cyclohexane, cyclopentane, or the alkyl-substituted cycloalkanes, etc. and the halogenated hydrocarbons. When using a propiolic acid as a starting material in the esterification reaction, water is formed as a by-product material and since the reaction is of the equilibrium type, it is preferred that the by-product water be removed continuously during the course of the reaction in order to have the equilibrium shift in the desired direction. A solvent or diluent employed in the reaction may be selected on the basis that it will form an azeotrope with water or that it boils above water, and thus the temperature of reaction can be maintained at a level which facilitates removal of the water without effecting the diluent or solvent. Considering the prerequisites of the solvent or diluent, generally any organic material which is non-reactive with either the reactants or the product materials may be employed. The quantity of solvent or diluent employed in the reaction varies considerably depending upon the result which is desired. In some instances, it may be desirable to employ a relatively small quantity of diluent as compared to the amounts of reactants which are being used, whereas in other cases, it may be desirable to use a relatively large quantity of solvent or diluent to facilitate intermixing of the reactants.

I have also found that when effecting the reaction with the free acid or the propiolic anhydride as the acidic reactant, it is advantageous to operate in the presence of an acidic material as catalyst. Acids which are useful for this purpose are for example, the mineral acids such as sulfuric, phosphoric or chlorosulfonic acid, acidic salts such as magnesium bisulfite or organic sulfonic acids, such as benzenesulfonic acid, or 4-toluenesulfonic acid, etc.

Dipropiolate esters thus provided by this invention are for example, 2,2'-sulfonyldiethanol dipropiolate, 2,2'-sulfonyldipropanol dipropiolate, 3,3'-sulfonyldipropanol dipropiolate, 3,3'-sulfonyldiisobutanol dipropiolate, 4,4'-sulfonyldiisopentanol dipropiolate and 4,4'-sulfonylbis-(3-ethylbutanol)dipropiolate.

The presently provided dipropiolate esters of the sulfonyl glycols mentioned above are stable, well-characterized compounds which are advantageously employed for a variety of industrial and agricultural purposes, for example, as plasticizing agents for thermoplastic resins so as to increase their moldability without unduly softening them at room temperature, as cross-linking agents for polyol materials such as saccharides, examples being cellulose and starch materials to enhance the chemical and physical properties thereof. The present compounds may also be advantageously employed as biological toxicants by incorporating them into an emulsion or solid carrier to give compositions which may be applied to either infested areas or to locales which may be subjected to infestation by fungus or microbiological organisms. For example, in soil infested with the fungus, *Pythium ultimum*, the mycelial growth of the fungus was completely inhibited when such soil was drenched at 100 parts per million (p.p.m.) and 30 p.p.m. (on a soil weight basis) with solutions containing 2,2'-sulfonyldiethanol dipropiolate as the active ingredient. These compounds may be dissolved or suspended in an organic liquid diluent or solvent which solution or mixture may then be admixed with water containing an emulsifying agent to form an oil-in-water emulsion. Because of their effectiveness, they may be present in toxicant compositions in only very small concentrations, for example, in concentrations of from 0.0001% to 1% by weight of the total weight of the emulsions. Emulsifying agents which may be employed are those customarily used in the art for the preparation of oil-in-water emulsions. Examples of emulsifying agents which may be used include alkylbenzene sulfonate, long-chained polyalkylene glycols, long-chained alkyl sulfosuccinates, etc. These compounds may also be incorporated into solid carriers such as clay, talc, pumice or bentonite to give compositions which may be applied as dusts or admixed with commercial fertilizer compositions and applied by conventional apparatus used in the art. They may also be dissolved in liquefied gases such as fluorochloroethanes, or methyl chloride and applied from aerosol bombs containing the solution.

The invention is further illustrated by, but not limited to, the following example.

*Example*

A mixture of 2,2'-sulfonyldiethanol (15.4 g., 0.1 mole), 15.4 g. (0.22 mole, 10% excess) of propiolic acid, 0.5 g. of para-toluenesulfonic acid, and 150 ml. of benzene was stirred at reflux under a Dean Stark apparatus for 9 hours. When 3.5 ml. (97% theory) of water had evolved the refluxing was discontinued. One hundred ml. of ethyl ether was added and the reaction mixture was washed successively with two 100 ml. portions of 10% sodium bicarbonate solution and two 100 ml. portions of water. The organic phase was separated from the aqueous phase and dried over anhydrous magnesium sulfate for two hours. After filtering, the reaction mixture, the residue was evaporated to leave 7.5 g. of 2,2'-sulfonyldiethanol dipropiolate as a yellow oil which analyzed 47.57% carbon and 4.26% hydrogen as compared to 46.51% carbon and 3.90% hydrogen the calculated values. Infrared analyses of the product gave the following results

| cm.$^{-1}$ | Function Indicated |
|---|---|
| 3,275 | ≡CH |
| 2,950 | —CH aliphatic |
| 2,125 | —C≡CH |
| 1,725 | C=O |
| 1,330 | SO$_2$ |
| 1,230, 1,130 | —C—O—ester |
| 753 | ≡CH | which data are consistant with the structure

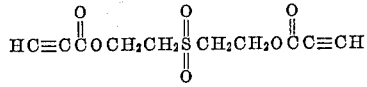

I claim:
1. A compound of the formula

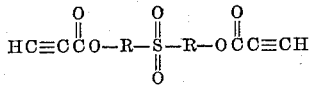

wherein R is an alkylene radical having from 2 to 4 carbon atoms in the alkylene chain and a total of from 2 to 6 carbon atoms in the alkylene radical.
2. 2,2'-sulfonyldiethanol dipropiolate.
3. A method which comprises reacting a member of the group consisting of propiolic acid, propiolyl halide, and propiolic anhydride with a compound of the formula

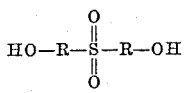

wherein R is an alkylene radical having from 2 to 4 carbon atoms in the alkylene chain and a total of from 2 to 6 carbon atoms in the alkylene radical.
4. A method which comprises reacting propiolic acid with 2,2'-sulfonyldiethanol, and recovering from the resulting reaction mixture 2,2'-sulfonyldiethanol dipropiolate.

References Cited in the file of this patent
UNITED STATES PATENTS
3,006,963   Buc et al. _____ Oct. 31, 1961

OTHER REFERENCES
Heaton et al.: J.A.C.S., vol. 71, pages 2948–2949 (1949).
Bull. Chim. Soc., France, 1950, pages 586–588 (article by Cologne et al., also abstracted in C.A. 45 (1951)), page 2401.